United States Patent [19]

Reinartz et al.

[11] Patent Number: 4,659,152
[45] Date of Patent: Apr. 21, 1987

[54] HYDRAULIC BRAKE SYSTEM WITH SLIP CONTROL

[75] Inventors: Hans-Dieter Reinartz, Frankfurt am Main; Helmut Steffes, Eschborn, both of Fed. Rep. of Germany

[73] Assignee: ITT Industries Inc., New York, N.Y.

[21] Appl. No.: 659,280

[22] Filed: Oct. 9, 1984

[30] Foreign Application Priority Data

Oct. 21, 1983 [DE] Fed. Rep. of Germany ....... 3338249

[51] Int. Cl.$^4$ .............................................. B60T 8/44
[52] U.S. Cl. .................................... 303/114; 303/119; 60/574; 60/591
[58] Field of Search ............... 303/114, 116, 119, 113, 303/115, 52; 188/181 R, 181 A; 60/574, 595, 591, 553

[56] References Cited

U.S. PATENT DOCUMENTS

| | | | |
|---|---|---|---|
| 3,032,996 | 5/1962 | Foreman | 60/574 |
| 3,877,756 | 4/1975 | Inda et al. | 303/114 |
| 4,416,491 | 11/1985 | Belart et al. | 303/113 |
| 4,523,791 | 6/1985 | Belart et al. | 303/114 |

FOREIGN PATENT DOCUMENTS

| | | |
|---|---|---|
| 2086508 | 5/1982 | United Kingdom . |
| 2086509 | 5/1982 | United Kingdom . |

Primary Examiner—John W. Caldwell, Sr.
Assistant Examiner—Alvin Oberley
Attorney, Agent, or Firm—James B. Raden; William J. Michals

[57] ABSTRACT

A vehicle hydraulic brake system with slip control, wherein a master cylinder (2) is pressurizable by a hydraulic poser booster (1). Valve means (23, 24, 29, 28, 32, 33, 34, 35) are inserted between the master cylinder (2) and the wheel brakes (25, 26, 30, 31) connected to the master cylinder (2), which valve means serve to remove pressure fluid from the wheel brakes (30, 31, 25, 26). Pressure fluid taken from the wheel brakes is replenished out of the pressure chamber (10) of the hydraulic power booster (1). A stroke limitation of the brake pedal (8) is effected during slip control. To simplify the design of the braking pressure generator (1, 2), the end surface of the master cylinder piston (5) close to the working chamber (16) is larger than the effective surface of the booster piston (4), and that a stepped piston is employed as master cylinder piston (5), an annular surface of said master cylinder piston (5) being adapted to be acted upon by the pressure prevailing in the working chamber (16). Accordingly, depression of the brake pedal through its full travel will be precluded in any operating condition of the brake system.

3 Claims, 1 Drawing Figure

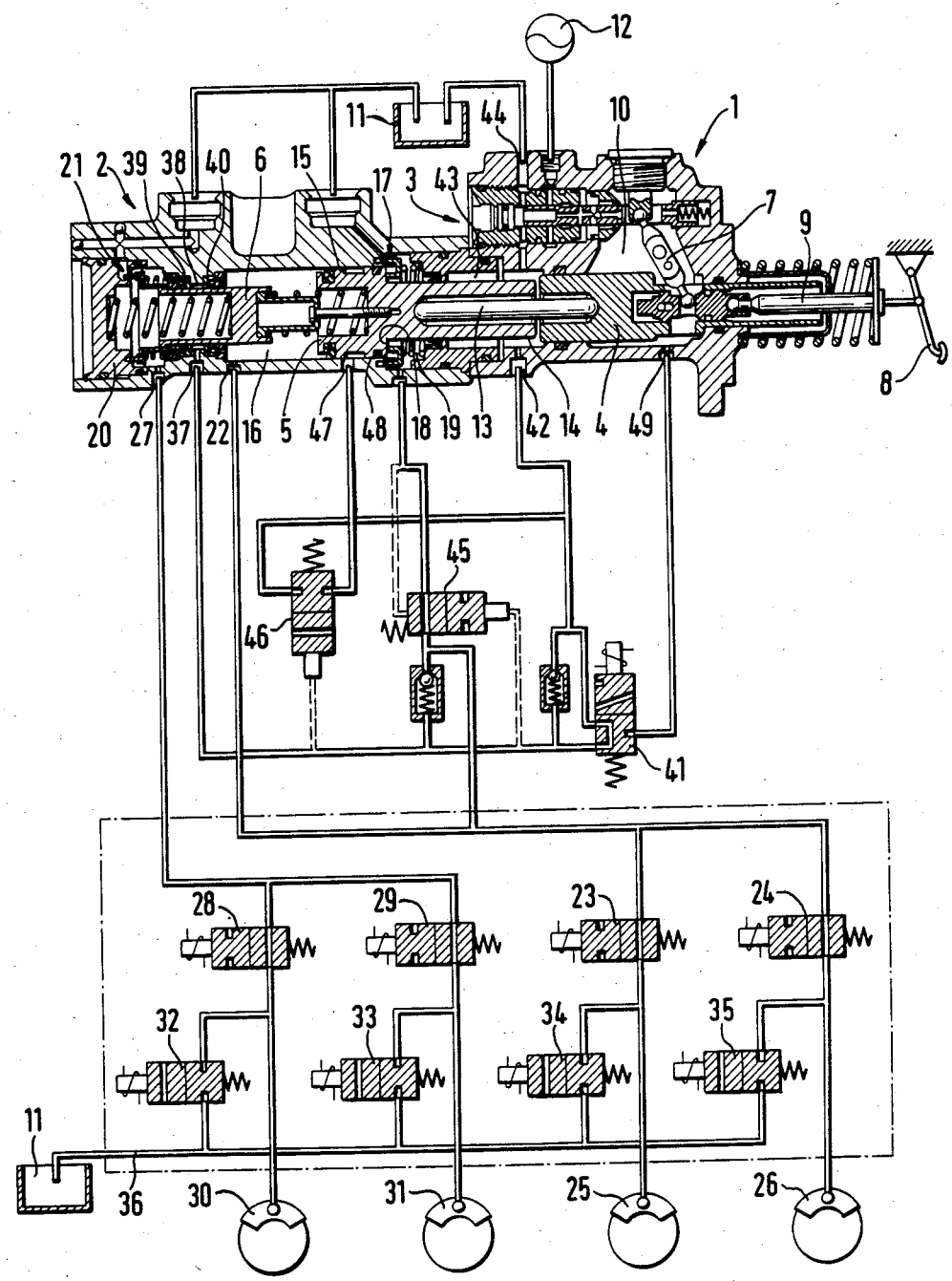

HYDRAULIC BRAKE SYSTEM WITH SLIP CONTROL

BACKGROUND OF THE INVENTION

The present invention relates to a hydraulic brake system with slip control, in particular for automotive vehicles, comprising a master cylinder pressurizable by a hydraulic power booster, in which system valve means are inserted between the master cylinder and the wheel brakes connected to the master cylinder which allow to remove pressure fluid from the wheel brakes, wherein the pressure fluid taken from the wheel brakes can be replenished out of the pressure chamber of the hydraulic power booster, and wherein a stroke limitation of the brake pedal is effected during slip control.

A hydraulic brake system incorporating the preceding features is known from German printed and published patent application No. 3040562. This known brake system comprises a hydraulic power brake booster is which a booster pressure proportional to the actuating force is determinable by a brake valve actuatable by a pedal. The hydraulic power booster serves to actuate a tandem master cylinder, to whose working chambers wheel brakes are connected. The connections between the working chambers of the tandem master cylinder and the wheel brakes connected thereto can be interrupted by electromagnetically actuatable valve means. In addition, further valve means are allocated to the wheel brakes which serve to remove pressure fluid from the wheel brakes in case of need, so that the effective braking pressure will drop, as a usual result whereof the vehicle wheel concerned will be re-accelerated sufficiently in the event of an imminent locked condition.

Pressure fluid that has been removed from the wheel brakes during brake slip control will be replenished out of the pressure chamber of the hydraulic power booster, and the pressure fluid prevailing in the pressure chamber of the hydraulic power booster is fed into the corresponding working chambers via additional valve means through the sleeves of the master cylinder pistons. The known brake system necessitates a stroke limitation with a view to ensuring the availability of a minimum volume in the tandem master cylinder. For this purpose, upon pressurization of the working chambers of the tandem master cylinder, a so-termed positioning sleeve will be simultaneously pressurized in the brake's release position in opposition to a spring force, as a result whereof the positioning sleeve will move to bear against a stop of the booster piston and prevent further depression of the booster piston and of the master cylinder pistons owing to the ratios of effective surfaces prevailing.

As a function of the ratios of friction values prevailing, in the brake unit described the brake pedal may be reset through the booster piston in opposition to the actuating force exerted on the brake pedal. On the other hand, it is possible in the event of low friction values, in the presence of which the limit of wheel lock will be attained at relatively low master cylinder pressures already, that upon commencement of the slip control the brake pedal will perform an additional travel in the actuating direction, prior to the stop of the booster piston having moved into abutment on the positioning sleeve. A like mode of function may erroneously lead the vehicle driver to think that the entire brake system is defective. As a whole, the known brake system is of relatively complicated design which is in first line condition by the fact that the booster piston is partially guided in the positioning sleeve, while the positioning sleeve itself needs to be arranged slidably in the housing in a fashion pressure-sealed at its outer periphery.

It is therefore an object of the present invention to structurally simplify the hydraulic brake system of the species initially referred to and to prevent a depression of the brake pedal through its full travel during the control at low coefficients of friction of the road surface.

SUMMARY OF THE INVENTION

This object will be achieved by the present invention in that the end surface of the master cylinder piston close to the working chamber is larger than the effective surface of the booster piston, and wherein a stepped piston is employed as master cylinder piston, with an annular surface of the master cylinder piston being adapted to be acted upon by the pressure prevailing in the working chamber. The effective surface of the master cylinder piston will be reduced during normally braking operations, while there is provision of valve means by which the pressurization of the annular surface of the master cylinder piston can be cut off. When the valve means are switched over, the effective surface of the master cylinder piston will increase so that a resetting force will be exerted on the master cylinder piston and on the brake pedal, respectively, when the working chamber of the master cylinder is connected to the pressure chamber of the hydraulic power booster. Such valve means is preferably an electromagnetically or hydraulically controllable two-way/two-position valve.

There is established a normally opened connection, which is adapted to be closed by the two-way/two-position control valve, between the working chamber of the master cylinder and an annular chamber bounded by the annular surface of the master cylinder piston. In the brake's release position and during normal braking operations (without slip control), the two-way/two-position control valve is in its opened position and will be switched to assume its closed position exclusively when a control action takes place. The annular chamber bounded by the annular surface of the master cylinder piston is hydraulically isolated when the two-way/two-position control valve is in its closed position, and the pressure fluid volume enclosed in the annular chamber will prevent displacement of the master cylinder piston in the brake's release direction in consequence of the controlled delivery of dynamic pressure into the working chamber. The effective surface of the master cylinder piston is less than the effective surface of the booster piston in the opened position of the two-way/two-position control valve. Furthermore the annular chamber confined by the annular surface of the master cylinder piston disposes of a controllable connection to an unpressurized supply reservoir. Preferably, a normally closed two-way/two-position control valve which is opened during control is inserted into this connection to the unpressurized supply reservoir. The two-way/two-position control valve is controllable hydraulically, the control port being adapted to be acted upon by the pressure in the pressure chamber of the hydraulic power booster. Furthermore, according to an advantageous embodiment of the present invention a throttle is arranged in the connection to the unpressurized supply reservoir which serves to damp the axial displacements of the master cylinder piston. In a preferred embodiment, the throttle is provided with a throttle bore which terminates radially into the master cylinder housing and which is closed by the master cylinder piston in the brake's release position. Located at the master cylinder piston is a sealing element by which the throttle bore can be closed. Owing to the sealing element shaped at the master cylinder piston, the connection between the annular chamber confined by the annular surface of the master cylinder piston and the unpressurized supply reservoir is in additional controllable travel-responsively. The connection will only be released if the master cylinder piston has performed a minimal stroke. In case this minimal stroke is exceeded, a resetting of the master cylinder piston will take place during control only so far until the sealing element shaped at the master cylinder piston has closed the throttle bore.

In respect of the realization of a multiple-circuit brake system, a second master cylinder piston is hydraulically actuatable by the pressure in the working chamber of the master cylinder. Connectable to the working chambers resulting form this measure are two brake circuits independent of one another. If the master cylinder is of such design, it will be expedient to house two sealing sleeves acting as check valve in the bore portion that receives the second master cylinder piston, with the sealing sleeves allowing pressure fluid out of the pressure chamber of the hydraulic power booster to be introduced into the working chambers.

BRIEF DESCRIPTION OF THE DRAWING

An embodiment of the present invention will be described in more detail hereinbelow with reference to the accompanying drawing in which the single FIGURE illustrates a hydraulic brake system.

DETAILED DESCRIPTION

In the drawing, reference numeral 1 designates a hydraulic power booster by which a tandem master cylinder 2 is actuatable. The hydraulic power booster comprises a brake valve 3 which is located substantially in parallel to the axis of a booster piston 4 and of master cylinder pistons 5, 6, respectively. Via a lever actuation 7, the brake valve 3 is connected to a push rod 9 coupled to a brake pedal 8. Moreover, the hydraulic power booster 1 includes a pressure chamber 10 which communicates via the brake valve 3 with an unpressurized supply reservoir 11 in the brake's release position. When the brake pedal 8 is applied with force, pressure fluid flows from a hydropneumatic pressure accumulator 12 into the pressure chamber 10 so that a pressure will develop in the pressure chamber that is proportional to the actuating force.

The master cylinder piston 5 is arranged coaxially to the booster piston 4 and is slidable in the actuating direction by a rod 13 disposed between the pistons 5, 4. The master cylinder piston 5 is designed as stepped piston, the piston step 14 of smaller diameter showing to the booster piston 4, while the piston step 15 of larger diameter confines a working chamber 16 of the master cylinder 2. The working chamber 16 is normally in communication with the unpressurized supply reservoir 11 via a travel-responsively actuatable valve 17. Between the piston steps 14, 15, the master cylinder piston 5 disposes of an annular surface 18 which is confined by an annular chamber 19. The master cylinder piston 6 is arranged coaxially relative to the pistons 4, 5 and is slidable hydraulically in the actuating direction by a pressure developing in the working chamber 16. The master cylinder piston 6 confines a second working chamber 20 which, in the brake's release position, has a connection the unpressurized supply reservoir 11 via a valve 21 which corresponds to the valve 17.

Terminating into the first working chamber 16 is a housing port 22, to which wheel brakes 25, 26 are connected via electromagnetically actuatable two-way/two-position control valves 23, 24, the said wheel brakes being for instance those at the rear axle of an automotive vehicle. Communicating with the working chamber 20 of the master cylinder 2 is a housing port 27, to which wheel brakes 30, 31 are connected via electromagnetically actuatable two-way/two-position control valves 28, 29, the said wheel brakes being for instance those at the front axle of the automotive vehicle. Connected between the electromagnetically actuatable valves 23, 24, 28, 29, which latter are controllable by a non-illustrated slip control electronics and which normally assume an open-passage position, are electromagnetically actuatable two-way/two-position control valves 32, 33, 34, 35 which are likewise controllable by the non-illustrated slip control electronics and which normally assume a closed position. Connected to the electromagnetically actuatable two-way/two-position control valves 32, 33, 34, 35 is one joint return line 36 which leads to the unpressurized supply reservoir 11. An appropriate change-over of the two-way/two-position control valves allocated to the wheel brakes will enable to keep constant or to decrease the pressure in each wheel brake 30, 31, 25, 26 independently of the pressures prevailing in the working chambers 16, 20, thereby averting an imminent locked condition.

The master cylinder contains another housing port 37 which terminates radially into an annular chamber 38 surrounding the master cylinder piston 6. Connections can be established from the annular chamber 38 via sealing sleeves 39, 40 acting as check valve to the housing port 37 leading to the working chambers 16, 20 of the master cylinder 2. In the brake's release position and during normal braking operations (without slip control), the housing port 37 is via a three-way/two-position control valve 41, a housing port 42, a housing chamber 43 and a housing port 44 in communication with the unpressurized supply reservoir 11. The three-way/two-position control valve is via housing port 45 and corresponding pressure lines in communication with the pressure chamber 10 of the hydraulic power booster. The three-way/two-postion control valve is likewise controllable by the non-illustrated slip control electronics and, when energized, connects the pressure chamber 10 of the hydraulic power booster 1 to the circumferential annular chamber 38.

Another component of the inventive brake system is a two-way/two-position control valve 45 which is normally in an opened position and thereby constitutes a connection between the working chamber 16 of the master cylinder 2 and the annular chamber 19. Said valve 45 is controllable pressure-responsively, it will be changed over to assume the closed position as soon as the circumferential annular chamber 38 is connected to the pressure chamber 10 of the hydraulic power booster 1. In a corresponding fashion, the pressure in the pressure chamber 10 of the hydraulic power booster causes actuation of another two-way/two-position valve 46 which normally adopts a closed position. This two-way/two-position valve is, on the one hand, in communication with the housing port 42 and with the unpressurized supply reservoir 11, respectively. On the other hand, a pressure line leads from the valve 46 to a housing port 47, the said housing port 47 being isolated by the peripheral surface of the larger piston step 15 of the master cylinder piston 5 below a predetermined actuating travel. In excess of a predeterminable actuating travel, the housing port 47 will be connected with the annular chamber 19. For better sealing the annular chamber 19 in relation to the housing port 47, the peripheral surface of the larger piston step 15 of the master cylinder piston 5 is provided with a circumferential seal 48. The housing port 47 is designed as a throttle bore.

The mode of operation of the brake system described will be explained in more detail hereinbelow, starting from the brake's release condition in which no actuating force is applied on the brake pedal 8 and all parts assume their position to be seen in the drawing. When an actuating force is exerted on the brake pedal 8, the pressure chamber 10 of the hydraulic power booster 1 will first be isolated from the unpressurized supply reservoir by the brake valve 3. After a predefined actuating travel, pressure fluid out of the hydropneumatic pressure accumulator 12 will be metered via the brake valve 3 into the pressure chamber 10, the pressure prevailing in the pressure chamber 10 being proportional to the actuating force applied on the brake pedal 8. After the hydraulic pressure in the pressure chamber 10 has exceeded a specific level,, the booster piston 4 will move to the left when viewing in the drawing, the said movement of the booster piston 4 being transmitted via the rod 13 onto the master cylinder piston 5. After a small travel of the master cylinder piston 5, the valve 17 will close and thereby isolate the working chamber 16 from the unpressurized supply reservoir 11. After closure of the valve 17, further displacement of the master cylinder piston 5 in the actuating direction has as a consequence that a hydraulic pressure develops in the working chamber 16 which causes hydraulic displacement of likewise the master cylinder piston 6 in the actuating direction. Hence follows that pressure development takes place in the second working chamber 20 of the master cylinder 2, too. The hydraulic pressure generated in the working chambers 16, 20 are fed to the wheel brakes 25, 26, 30, 31 so that the vehicle will be braked.

Via the opened two-way/two-position control valve 45, the pressure prevailing in the first working chamber 16 propagates also into the annular chamber 19 so that the piston step 14 of smaller diameter exclusively will be responsible for the pressure generation in the first working chamber 16.

When the non-illustrated slip control electronics recognizes an imminent locked condition at one or at several of the monitored vehicle wheels, first the three-way/two-position control valve will change over so that the annular chamber 38 of the master cylinder 2 is in communication with the pressure chamber 10 of the hydraulic power booster. In addition thereto, the pressure of the pressure chamber 10 is supplied to the control ports of the two-way/two-position valves 45,46 so that the valves 45, 46 will change over. Changing-over of the two-way/two-position control valve 45 has as a result hydraulic isolation of the annular chamber 19. The changing-over of the two-way/two-position control valve 46 connects the housing port 47 to the unpressurized supply reservoir 11.

It shall be assumed that the vehicle wheel allocated to the wheel brake 30 has a critical slip value. Consequently, the slip control electronics will switch the two-way/two-position control valve 28 to assume a closed position, whereby the connection between the working chamber 20 of the master cylinder 2 and the wheel brake 30 is interrupted and the pressure in the wheel brake 30 remains constant independently of the pressure in the working chamber 20. In case a like phase of maintaining the pressure constant does not suffice to bring about re-acceleration of the wheel, likewise the two-way/two-position control valve 32 will be switched over so that pressure fluid is removed from the wheel brake. Pressure fluid that has been taken from the wheel brake 30 this way will be delivered out of the circumferential annular chamber 38 by way of the sealing sleeve 39 into the working chamber 20. Similarly, delivery of pressure fluid into the working chamber 16 takes place via the sealing sleeve 40, provided that pressure fluid was removed from the wheel brakes 25, 26.

The case the brake slip control starts already at a point of time, at which the housing port 47 is still isolated by the peripheral surface of the master cylinder piston 5, there will be no resetting of the brake pedal, since although the end surface of the larger piston step 15 of the master cylinder piston 5 is acted upon in the brake's release direction by the pressure in the pressure chamber 10 of the hydraulic power booster 1, the pressure fluid volume enclosed in the annular chamber 19 acts as a hydraulic obstruction. If, on the other hand, the housing port 47 will have been released already by the peripheral surface of the larger piston step 15 upon commencement of the slip control, a resetting of the brake pedal will take place, since the end surface of the larger piston step 15 is acted upon in the brake's release direction and pressure fluid is allowed to escape from the annular chamber 19 via the housing port 47 and the opened two-way/two-position control valve to the unpressurized supply reservoir 11. Due to the throttling effect of the housing port 47, this resetting movement will perform in a damped manner. As soon as the circumferential seal 48 overrides the housing port 47, the resetting action will be terminated. In the action of brake release, the sequences of motion described will be reversed until the brake system described will have re-assumed the position to be gathered from the drawing. Further, during slip control, a stroke limitation of the brake pedal is effected.

What is claimed is:

1. A hydraulic brake system with slip control for use with automotive vehicles having wheel brakes, said system comprising, in combination:

a master cylinder having a stepped master cylinder piston slidably mounted therein adjacent to a working chamber of said master cylinder, said piston having an annular chamber surrounding a central portion of said piston;

a pedal actuated hydraulic brake booster operatively coupled to said master cylinder, said brake booster having a booster piston slidably mounted therein adjacent to a pressure chamber and wherein the end surface of said master cylinder piston adjacent said working chamber is larger than the effective surface of said booster piston;

valve means hydraulically connecting said master cylinder to said wheel brakes, said valve means removing pressure from said wheel brakes during slip control;

an unpressurized reservoir;

second valve means responsive to slip control electronics and connected between the pressure chamber and hydraulically actuated first and second control valves for actuating said control valves during slip control;

said first control valve connected between said working chamber and said annular chamber, said first control valve being normally open and being closed during slip control; and a said second control valve connected to said supply reservoir, and being connected to said annular chamber the master cylinder piston being actuated in excess of a predetermined travel, said second control valve being normally closed and being opened during slip control.

2. The brake system according to claim 1, wherein said second control valve includes a hydraulic control port operatively coupled to said pressure chamber of said hydraulic booster.

3. The brake system according to claim 2, wherein said master cylinder includes a second master cylinder piston slidably mounted therein adjacent to a second working chamber, and metering means coupled between said pressure chamber of said brake booster and the working chambers of said master cylinder for metering pressure fluid therebetween.

* * * * *